WILLIAM H. KOSHT.
Farm Gate.

No. 117,431 — Patented JUL 25 1871

Witnesses: A. G. Crosby, Andrew Choffin

William H. Kosht, Inventor
by Job Abbott, Attorney

117,431

UNITED STATES PATENT OFFICE.

WILLIAM H. KOSHT, OF ASHLAND, OHIO.

IMPROVEMENT IN GATES.

Specification forming part of Letters Patent No. 117,431, dated July 25, 1871.

*To all whom it may concern:*

Be it known that I, WILLIAM H. KOSHT, of Ashland, Ashland county, Ohio, have invented certain Improvements in Farm-Gates; and that the following is a full, clear, and exact specification thereof, which will enable others skilled in the art to make and use my said invention.

My invention relates to an improved mode of securing the hinge to the gate-post; also, to an improved mode of arranging the parts of the gate to prevent it from being raised from the hinges when closed, and to allow of its being hung at different heights, so as to open over a considerable depth of snow or over any other obstruction, said improvements serving to increase the durability of the gate without increasing its cost, and adapting it to use under any circumstances, as well as rendering it less liable to derangement from the attempts of cattle or hogs to raise or open it.

Figure 1:
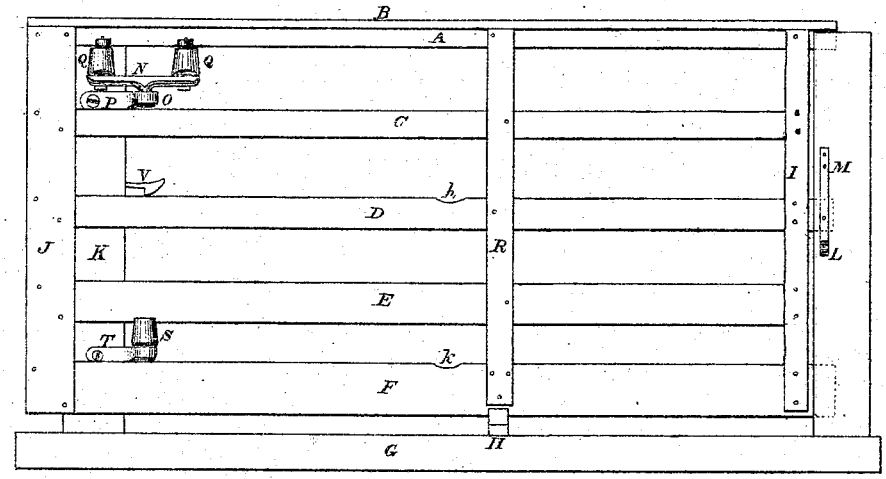
Figures 2, 5, 6:
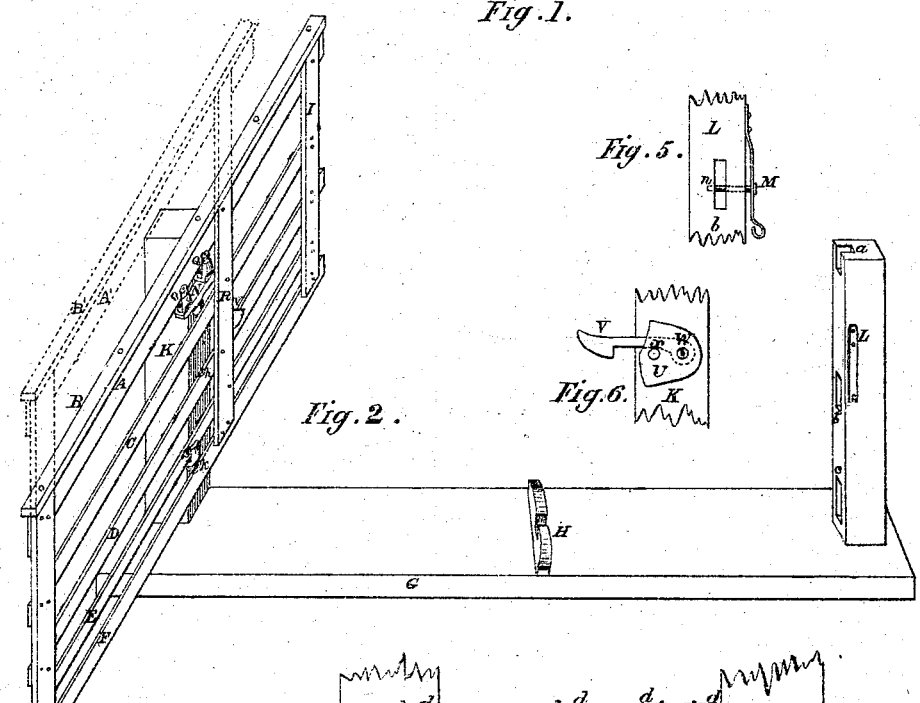
Figures 3, 4:
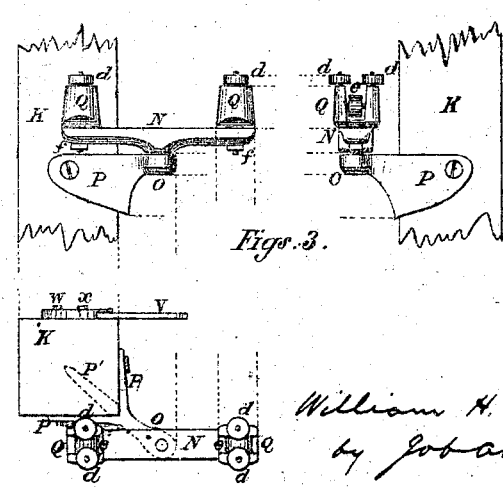

In the accompanying drawing, Figure 1 is a front view of my gate as it appears when closed. Fig. 2 is a perspective view of the same as it appears when opened. Figs. 3 are side and end views and plan of the upper gate-hinge and arm. Fig. 4 is an end view of the lower gate-hinge and arm. Fig. 5 is a detail view of the gate-fastener. Fig. 6 is a detail view of the latch for holding the gate when opened.

The gate-sill G, shown in drawing, (which may be omitted in practice,) has secured in it the gate-posts K and L, and near its center is placed the block H, which has a notch in which the gate rests when closed. The hinge-arm O P P' P consists of the arm O, at the rear end of which are the branches P P and the tang P', and these branches P are fitted and screwed, nailed, or bolted to the two adjacent faces of the post K, in order to distribute the weight over those faces so as to avoid the danger of splitting the post or tearing out the screws or other fastenings, while the tang P' is fitted in a hole in the post K and serves as a support for the inner corner of the arm-branches P, which might, under a heavy load, be forced down so as to throw a lateral strain on the screws or fastenings for the branches, and thus tend to split the post were it not for such supports. The pivot-pin is secured in the outer end of the arm O, and on it is placed the cross-piece N, on the ends of which are secured the head-blocks Q Q, which have bolts on their lower ends, which pass down through the pins N and are secured by nuts $f$ $f$. These head-blocks Q are notched out in the center, and have the friction-wheel $e$ journaled in the said notch, and the horizontal friction-wheels $d$ $d$ are journaled on the top of the block Q at each side of the notch in said block, as shown in Figs. 3. The lower hinge S T has its arm T secured to the post K by means of two branches fastened to adjacent faces of the post, as described in connection with the upper hinge-arm; but the hinge-block S is simply notched to receive a friction-wheel like the wheel $e$ in the upper hinge, and has no side friction-wheels like the wheels $d$, shown in the upper hinge, as it has little or no weight to sustain except when the gate is closed, and simply serves to steady the bottom of the gate while being opened. The gate consists of the rails A C D E F, united by the battens I R J and covered by the cap-piece B, the space between the rails A and C being a little greater than the distance from the bottom of the arm Q to the top of the friction-wheels $e$, and the space between the rails C and D being made about the same as said last-mentioned distance, while the space between the adjacent edges of the rails A and F is made about equal to the distance between the bottom of the arm T and the top of the wheels $e$. The notches $h$ and $k$ are cut in the rails D and F, and are of a depth equal to the distance between the top of the wheels $e$ and the upper faces of the wheels $d$ $d$, from which it will be seen that the gate can be hung in the manner shown in Fig. 2 by bringing the rail A over between the wheels $d$ $d$ onto the wheel $e$, and then swinging in the lower edge of the gate by allowing the arm T to pass through the notch $k$; and it will be evident that when the gate is thus placed on the hinges, and is slid in either direction so as to bring the notch $k$ away from the arm T, it cannot be thrown from the hinges, as the arm T will bear on the rail F and prevent the gate from being raised.

When the gate is to be hung at a considerable height above the ground, as indicated by dotted lines A' B' in Fig. 2, the rail C is placed on the wheels $e$ $e$ between the wheels $d$ $d$, and the notch $h$ allows the arm Q to pass the rail D in swinging in the lower edge of the gate, in order to bring the lower rail F over the hinge S; and it will be seen that in this case the gate is held from being lifted when slid out by the bearing of the arm O on the rail D. When the gate is open and in the position shown in Fig. 2 it is held open by the latch V, which is pivoted on a pin, W, in the shield U on the post K, said latch being supported by a pin, X, so as to latch itself when the gate is thrown back, as shown in detail in Fig. 6. In closing the gate the operator turns it into line with the block H and then slides it toward the post L, in which are cut the mortises $a\ b\ c$, which receive the ends of the rails A D F, and thus hold the gate firmly in position when closed. To prevent the gate from being opened by animals the spring-fastening M is secured to the post L, and has a pin, $n$, which runs through the post into the mortise $b$, as shown in Fig. 5. The end of the rail D is beveled off on one side, so that when the gate is slid up to the post L the beveled end of the rail D forces back the pin $n$ until it comes opposite a hole in the rail D, when the force of the spring M forces it into said hole and thus locks the gate.

What I claim as my invention, and desire to secure by Letters Patent, is—

1. The hinge-arm O P P′ P, provided with the two branches P P and the tang P′, for the purpose of securing said arm to both the adjacent faces of the gate-post, and of supporting the inner corner of said branches to avoid lateral strain, substantially as herein specified.

2. The gate B A C D E F, having the notches $h$ and $k$ cut in the rails D and F, in combination with the gate-post K provided with the hinges Q Q N O P P′ P and S T, the distances between the rails A, C, D, and F being made to correspond with the relative positions of the parts of the hinges, in the manner and for the purpose herein specified.

As evidence of the foregoing witness my hand this 6th day of May, 1871.

WILLIAM H. KOSHT.

Witnesses:
A. L. CURTIS,
ROBT. McMURRAY.